United States Patent
Xu et al.

(10) Patent No.: US 11,998,843 B2
(45) Date of Patent: Jun. 4, 2024

(54) GAME CONTROL METHOD AND APPARATUS, ELECTRONIC DEVICE, AND COMPUTER READABLE STORAGE MEDIUM

(71) Applicant: Shanghai Yiyu Network Technology Co., Ltd., Shanghai (CN)

(72) Inventors: Zhiqin Xu, Shanghai (CN); Mei Peng, Shanghai (CN)

(73) Assignee: Shanghai Yiyu Network Technology Co., Ltd., Shanghai (CN)

( * ) Notice: Subject to any disclaimer, the term of this patent is extended or adjusted under 35 U.S.C. 154(b) by 323 days.

(21) Appl. No.: 17/530,454

(22) Filed: Nov. 18, 2021

(65) Prior Publication Data

US 2023/0069591 A1    Mar. 2, 2023

Related U.S. Application Data (63) Continuation of application No. PCT/CN2021/115045, filed on Aug. 27, 2021.

(51) Int. Cl.
   *A63F 13/533*  (2014.01)
   *A63F 13/537*  (2014.01)
   *G06F 3/0484*  (2022.01)

(52) U.S. Cl.
   CPC .......... *A63F 13/533* (2014.09); *A63F 13/537* (2014.09); *G06F 3/0484* (2013.01); *A63F 2300/303* (2013.01); *A63F 2300/308* (2013.01)

(58) Field of Classification Search
   CPC .................. A63F 13/533; A63F 13/537; A63F 2300/303; A63F 2300/308; G06F 3/0484
   See application file for complete search history.

(56) References Cited

U.S. PATENT DOCUMENTS

2011/0218028 A1*  9/2011  Acres .................. G07F 17/3225
                                                  463/20
2017/0046924 A1*  2/2017  Buriu ...................... G07F 17/34
(Continued)

FOREIGN PATENT DOCUMENTS

CN          109718545 A        5/2019

OTHER PUBLICATIONS

Empires & Puzzles: Epic Match 3. Play.google.com. Online. Jna. 18, 2021. Accessed via the Internet. Accessed Dec. 1, 2023. < URL: https://web.archive.org/web/20210118155850/https://play.google.com/store/apps/details?id=com.smallgiantgames.empires&hl=en_US&gl=US> (Year: 2021).*

(Continued)

*Primary Examiner* — Justin L Myhr
*Assistant Examiner* — Carl V Larsen (57) ABSTRACT

A game control method and apparatus, an electronic device, and a computer readable storage medium are disclosed. The method includes: receiving an object swap instruction on a pattern matrix on a first interface of a screen; swapping positions of a first pattern object and a second pattern object according to the object swap instruction, and upon detection that a predetermined number of pattern objects of the same type are connected after the positions of the first pattern object and the second pattern object are swapped, eliminating the connected pattern objects; and reducing a current health point value of a selected target attack object among multiple attack objects in a second interface. When the connected pattern objects are eliminated, the selected target attack object among the multiple attack objects is attacked to ensure the attack on the attack object during elimination of the pattern objects.

9 Claims, 6 Drawing Sheets

(56) References Cited

U.S. PATENT DOCUMENTS

2017/0072297 A1* 3/2017 Lehwalder .............. A63F 13/80
2017/0072311 A1* 3/2017 Maejima ................. A63F 13/42
2022/0080315 A1* 3/2022 Knutsson .............. A63F 13/537

OTHER PUBLICATIONS

Battle. empiresandpuzzles.fandom.com. Online. Mar. 30, 2021. Accessed via the Internet. Accessed Dec. 1, 2023. <URL: https://empiresandpuzzles.fandom.com/wiki/Battle?oldid=10456> (Year: 2021).*

Beginner's Guide to E&P Ep. 03—Maps, Quests, & Events. Youtube.com. Online. Apr. 17, 2019. Accessed via the Internet. Accessed Dec. 1, 2023. <URL: https://www.youtube.com/watch?v=TbvNXK5ZSpc> (Year: 2019).*

Beginner's Guide to E&P Ep. 04—Raid. Youtube.com. Online. Apr. 18, 2019. Accessed via the Internet. Accessed Dec. 1, 2023. <URL: https://www.youtube.com/watch?v=AqhbPhx8Ff0> (Year: 2019).*

* cited by examiner

GAME CONTROL METHOD AND APPARATUS, ELECTRONIC DEVICE, AND COMPUTER READABLE STORAGE MEDIUM

CROSS REFERENCE TO RELATED APPLICATIONS

The present application is a Continuation Application of PCT Application No. PCT/CN2021/115045 filed on Aug. 27, 2021, the contents of which are incorporated herein by reference in their entirety.

TECHNICAL FIELD

The present disclosure relates to the technical field of computers, and in particular, to a game control method and apparatus, an electronic device, a computer readable storage medium.

BACKGROUND

For the combination of a tower defense game and a match-three game, a game interface is usually divided into two parts. The upper half of the interface shows an attack object and a defense object in the tower defense game, where the attack object corresponds to an initial health point value, and a defense object corresponds to an initial defense value; the lower half of the interface shows a pattern matrix of the match-three game, where each matrix element in the pattern matrix corresponds to a pattern object. The player swaps the positions of two adjacent pattern objects such that three or more identical pattern objects are connected together, and these identical pattern objects will be eliminated. While the pattern objects are eliminated, a predetermined health point value will be subtracted from a current health point value of the attack object in front of the pattern objects.

However, when the pattern objects are eliminated, only the attack object in front of the eliminated pattern objects can be attacked. In this case, when the user needs to attack a specified attack object, the user does not know the exact area where the pattern objects need to be eliminated to attack the specified object. The user needs to predict whether the eliminated pattern objects can attack the specified attack object or not. The pattern matrix usually includes a large number of pattern objects, which makes it difficult for the user to predict whether the eliminated pattern objects are in front of the specified attack object or not. The user may think that the eliminated pattern objects can attack the attack object, but in fact they cannot, making the user's operation invalid. Or the eliminated pattern objects can actually attack the attack object, but the user does not think so, and as a result, the user does not perform the corresponding elimination operation. These two situations will affect the user experience and make it more time-consuming for the user to clear attack objects, thus increasing the duration of the game; moreover, each game takes up more processing resources of the terminal and the server.

SUMMARY

An objective of the present disclosure is to solve at least one of the technical problems in the prior art, and provide a game control method and apparatus, and an electronic device, so as to reduce invalid operations of the user and improve user experience, and also reduce the game duration due to invalid operations.

According to a first aspect, an embodiment of the present disclosure provides a game control method, including:

receiving an object swap instruction on a pattern matrix of a first interface of a screen, where the pattern matrix includes multiple matrix elements, and each matrix element is used for displaying a pattern object;

swapping positions of a first pattern object and a second pattern object according to the object swap instruction, and upon detection that a predetermined number of pattern objects of the same type are connected after the positions of the first pattern object and the second pattern object are swapped, eliminating the connected pattern objects; and generating an attack instruction according to the connected pattern objects, so as to reduce a current health point value of a selected target attack object among multiple attack objects in a second interface according to the attack instruction.

Further, the receiving an object swap instruction on a first interface of a screen includes:

receiving the object swap instruction on the pattern matrix in a specified area of the first interface, where the specified area is determined according to a position of the target attack object in the second interface, the target attack object exists within a preset attack range of the attack instruction that is generated after any pattern object in the specified area is eliminated, and the specified area is highlighted in the first interface.

Further, the target attack object is highlighted in the second interface.

Further, other areas in the first interface except the specified area are in a non-selectable state, and the non-selectable state indicates stopping reception of the object swap instruction.

Further, the method further includes:

controlling an attack object to attack at least one defense object in the first interface when display duration of the attack object in the first interface meets a preset condition.

Further, the controlling an attack object to attack at least one defense object in the first interface when display duration of the attack object in the first interface meets a preset condition includes:

controlling the attack object to attack at least one defense object within a preset attack range of the attack object when the display duration of the attack object in the first interface meets the preset condition.

Further, the number of attacks by the attack object is in direct proportion with the display duration of the attack object in the second interface, the display duration is determined according to the current health point value of the attack object, and when the current health point value is less than a preset value, the attack object disappears in the second interface.

Further, after the eliminating the connected pattern objects, the method further includes:

moving, according to elimination positions corresponding to the pattern objects, pattern objects above the elimination positions downward to fill the elimination positions; and generating new pattern objects to fill vacant positions generated after the downward movement.

According to a second aspect, an embodiment of the present disclosure provides a game control apparatus, including:

an instruction receiving module, configured to receive, when a first character is on a game interface of a game process, a character switching instruction on the game interface that displays the first character;

a data acquiring module, configured to acquire character data corresponding to a second character according to the character switching instruction; and a character switching module, configured to switch the first character to the second character on the game interface according to the character data.

According to a third aspect, an embodiment of the present disclosure provides an electronic device, including a memory, a processor, and a computer program stored in the memory and runnable on the processor, where the processor, when executing the program, implements the game control method described in the foregoing embodiment.

According to a fourth aspect, an embodiment of the present disclosure provides a computer readable storage medium, where the computer readable storage medium stores a computer executable instruction, and the computer executable instruction causes a computer to perform the game control method described in the foregoing embodiment.

When the connected pattern objects are eliminated, an attack instruction for the selected target attack object among the multiple attack objects is generated to ensure that the attack object can be attacked during elimination of the pattern objects, avoiding the situation that the user's operation is invalid or the user does not perform the corresponding elimination operation, thereby improving the user experience while reducing the long duration of the game due to the lack of the corresponding elimination operation by the user, thus avoiding taking up excessive processing resources of the terminal and the server.

BRIEF DESCRIPTION OF DRAWINGS

The following describes the present disclosure with reference to the accompanying drawings and embodiments.

DETAILED DESCRIPTION

The specific embodiments of the present disclosure are described in detail herein. The preferred embodiments of the present disclosure are shown in the accompanying drawings. The accompanying drawings are used to supplement the description of the textual part of the specification with graphics, such that people can vividly understand each technical feature of the present disclosure and the overall technical solution, but the accompanying drawings should not be understood as a limitation on the protection scope of the present disclosure.

Figure 1:
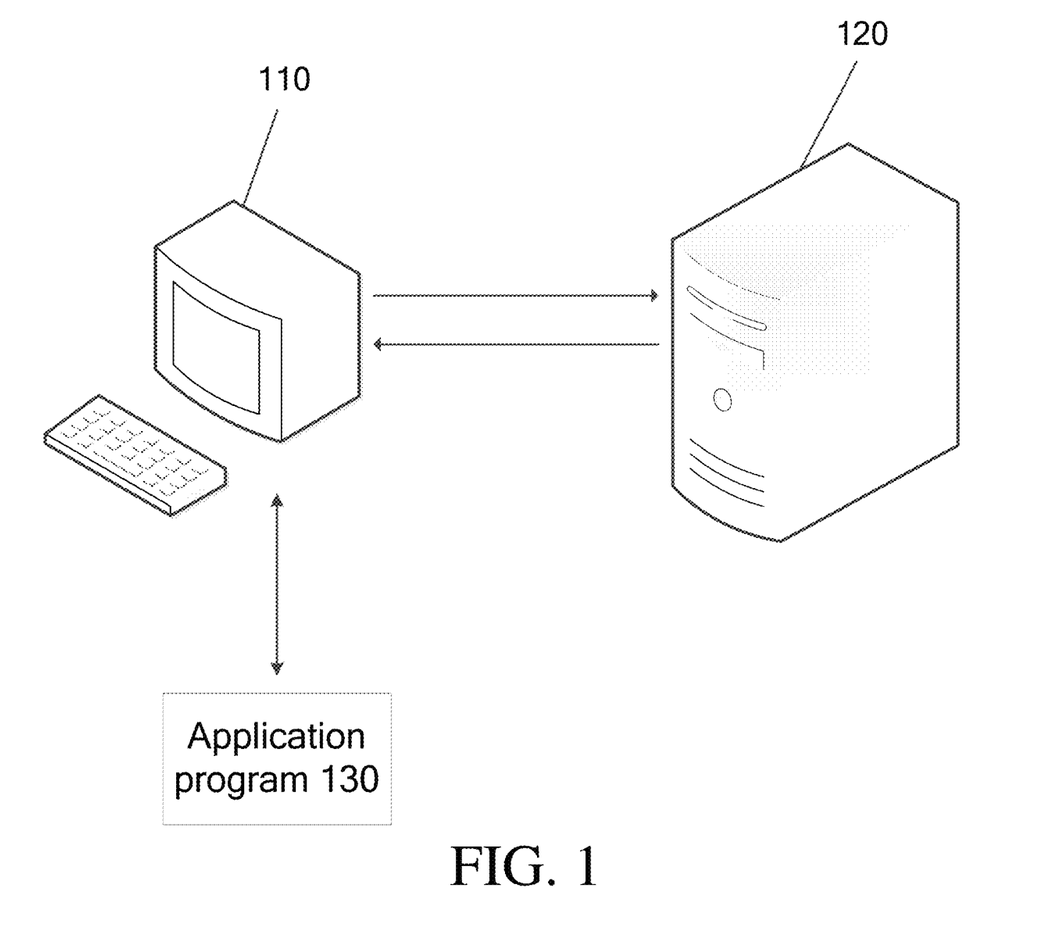
FIG. 1 is a diagram of an application environment of a game control method according to an embodiment.

The embodiments of the present disclosure are described below with reference to the accompanying drawings. The game control method of a virtual object provided in the embodiments of the present disclosure is applied to an application environment including a terminal device 110 and a server 120 as shown in FIG. 1. The terminal device 110 and the server 120 are connected via a network. The terminal device 110 may be a desktop terminal or a mobile terminal, where the mobile terminal may be one of a cell phone, a tablet computer, a laptop computer, a wearable device, etc. The server 120 may be implemented by an independent server or a server cluster composed of multiple servers, or may be a cloud server providing basic cloud computing services such as cloud services, a cloud database, cloud computing, cloud functions, cloud storage, network services, cloud communications, middleware services, domain name services, security services, CDN, and big data and artificial intelligence platforms. An application program 130 using the foregoing game control method is displayed by the terminal device 110.

Figure 2:
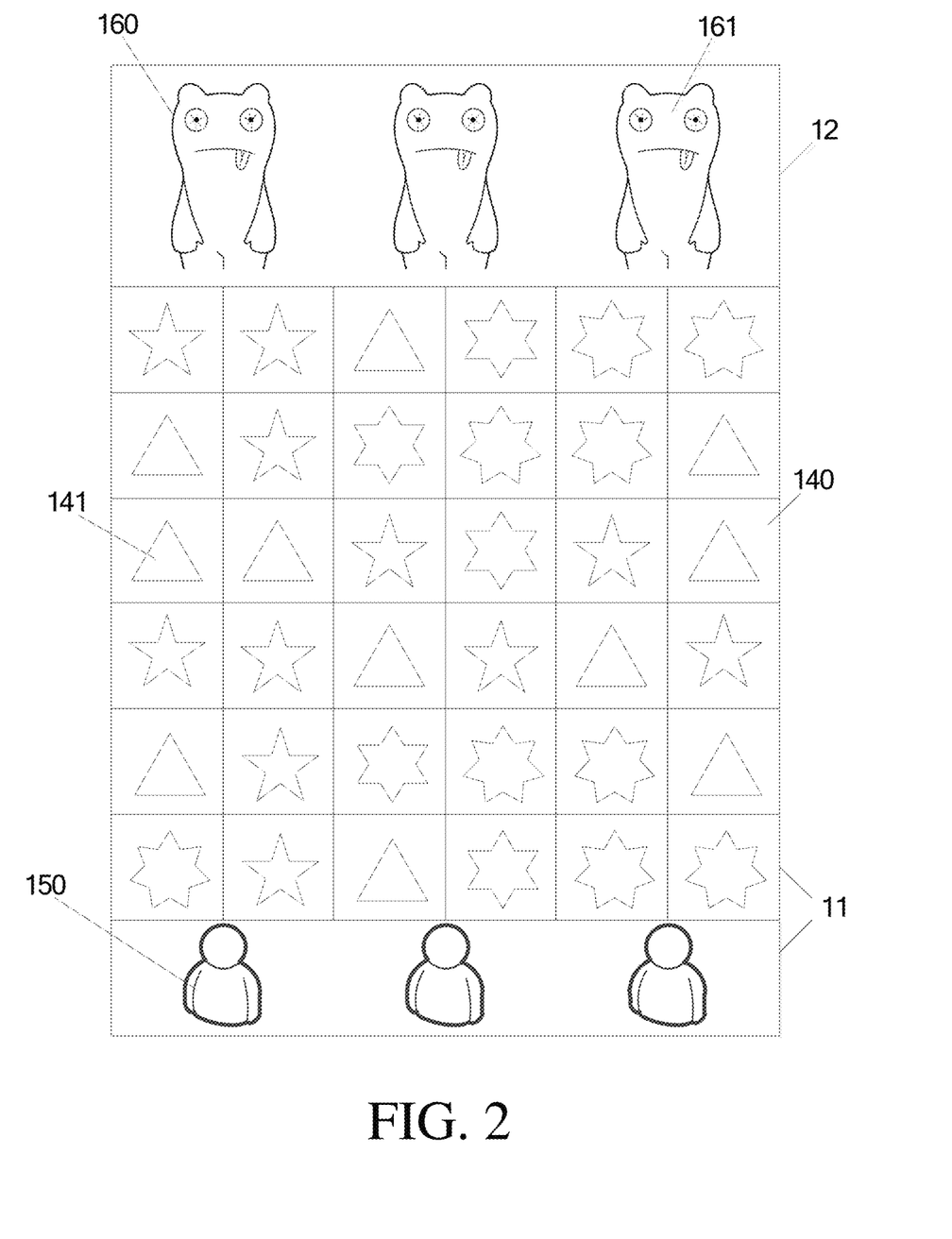
FIG. 2 is a schematic diagram of a user interface for a combination of a tower defense game and a match-three game according to an embodiment.

When the application program 130 is displayed by the terminal device 110, the terminal device 110 may display a user interface as shown in FIG. 2. The user interface is split into two parts, including a first interface 11 in the lower half and the second interface 12 in the lower half. The first interface displays a pattern matrix 140 of a match-three game and defense objects 150, where each matrix element in the pattern matrix 140 corresponds to one pattern object 141. A player swaps positions of two adjacent pattern objects 141, such that three or more identical pattern objects are connected together, and these identical pattern objects will be eliminated. Then, new pattern objects drop randomly, to fill the vacant positions that appear due to the elimination. The second interface displays attack objects 160 in a tower defense game. While the pattern objects are eliminated, the terminal device generates an attack instruction, such that a predetermined health point value is subtracted from a current health point value of a selected target attack object 161 among the attack objects. Then data generated after the predetermined health point value is subtracted from the current health point value is synchronized to the server. The attack object attacks the defense object at a regular time, such that a predetermined defense value is subtracted from a current defense value of the defense object. If the defense value of the defense object is reduced to 0, the game fails; if all attack objects are killed before the defense value of the defense object is reduced to 0, the player wins the game.

When the connected pattern objects are eliminated, an attack instruction for the selected target attack object among the multiple attack objects is generated to ensure that the attack object can be attacked during elimination of the pattern objects, avoiding the situation that the user's operation is invalid or the user does not perform the corresponding elimination operation, thereby improving the user experience while reducing the long duration of the game due to the lack of the corresponding elimination operation by the user, thus avoiding taking up excessive processing resources of the terminal and the server.

The game control method provided in the embodiments of the present disclosure will be illustrated in detail below through several specific embodiments.

As shown in FIG. 2, in an embodiment, a game control method is provided. This embodiment is mainly described with an example in which the method is applied to a computer device. The computer device specifically may be the terminal device 110 in FIG. 1.

Figure 3:
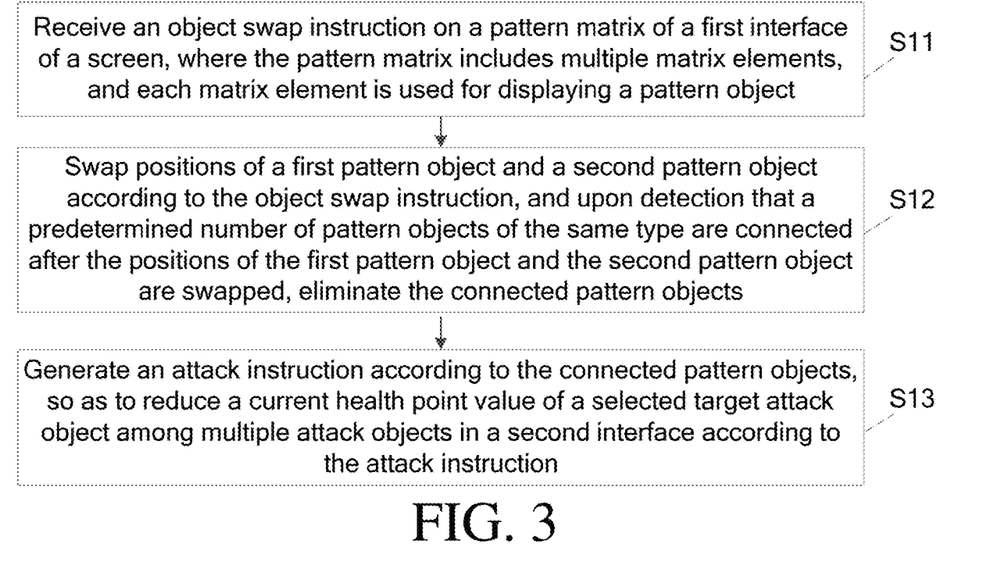
FIG. 3 is a schematic flowchart of a game control method according to an embodiment.

Referring to FIG. 3, the game control method specifically includes the following steps:

S11: Receive an object swap instruction on a pattern matrix of a first interface of a screen, where the pattern matrix includes multiple matrix elements, and each matrix element is used for displaying a pattern object.

In an embodiment, the screen of the terminal device displays a user interface of an application program, where the lower half of the user interface is the first interface having a pattern matrix with a predetermined size. The first interface includes multiple grids. As shown in FIG. 2, the first interface includes 6*6 grids, each grid corresponds to one matrix element, and all the grids form the pattern matrix.

In an embodiment, a frame is displayed in an area where each grid is located. The area where each grid is located is used for displaying a pattern object, which may be a pattern in a preset shape. Grids of different pattern objects may be distinguished through different backgrounds, for example, distinguished through different background colors, background styles, or background graphics.

For example, the screen is a touch screen of the terminal device. When receiving a touch operation of the user on the touch screen, the terminal device generates a corresponding control instruction. For example, when the terminal device receives the user's sliding operation from the position of the first pattern object to the position of the second pattern object on the touch screen, the terminal device generates an object swap instruction according to the sliding operation.

For example, the screen may alternatively be a display screen of the terminal device, and the terminal further includes an input device. The user operates the input device to trigger the terminal to generate a corresponding control instruction. For example, the terminal is a desktop computer. A mouse corresponds to an operation control on the screen. The screen displays the first interface. The user moves the mouse to control the operation control to move to the position of the first pattern object, then clicks the mouse to control the operation control to select the first pattern object, and holds and drags the mouse, such that the operation control moves to the position of the second pattern object while selecting the first pattern object. When the user releases the mouse, the terminal generates a pattern object swap instruction.

In an embodiment, the first pattern object is a pattern object displayed in the grid at the starting position of the sliding operation, and the second pattern object is a pattern object displayed in the grid at an end position of the sliding operation.

S12: Swap positions of a first pattern object and a second pattern object according to the object swap instruction, and upon detection that a predetermined number of pattern objects of the same type are connected after the positions of the first pattern object and the second pattern object are swapped, eliminate the connected pattern objects.

In order to further avoid invalid operations of the user, in an embodiment, before the positions of the first pattern object and the second pattern object are swapped according to the object swap instruction, it will be detected whether there is a target attack object selected by the user among the multiple attack objects in the second interface. If yes, the positions of the first pattern object and the second pattern object are swapped according to the object swap instruction; otherwise, prompt information for prompting the user to select a target attack object is generated and displayed on the screen, such that after the user selects a target attack object according to the prompt information, the user is prompted to enter input an object swap instruction again. In this way, the positions of the first pattern object and the second pattern object are swapped according to the newly inputted object swap instruction.

Figure 4:
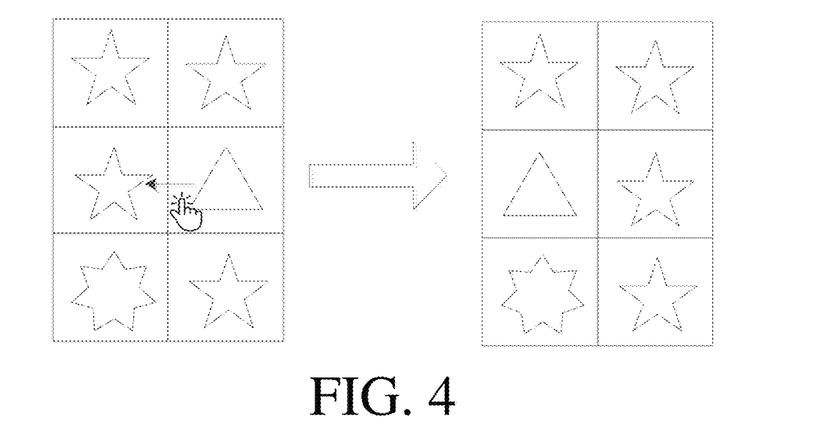
FIG. 4 is a schematic diagram of a sliding operation according to an embodiment.

In an embodiment, as shown in FIG. 4, the solid arrow represents a sliding direction of a finger, and an object swap instruction is generated when the finger slides. When receiving the object swap instruction, the terminal device moves the first pattern object in the left picture from the grid where it is originally located to the grid where the second pattern object in the right picture is originally located, and moves the second pattern object in the left picture from the grid where it is originally located to the grid where the first pattern object in the right picture is originally located. Then, it is detected whether a predetermined number of pattern objects of the same type are connected after the positions of the first pattern object and the second pattern object are swapped. If yes, the connected pattern objects are eliminated; otherwise, the first pattern object and the second pattern object return to the original positions. That is, the operation of swapping the positions of the first pattern object and the second pattern object is withdrawn, such that the first pattern object and the second pattern object return to the original positions before swapping.

In an embodiment, the connection is horizontal connection or vertical connection. For example, the predetermined number may be 3 or more, when 3 or more than 3 identical pattern objects are connected, the connected patterns will be eliminated. If 3 triangular patterns are connected, the 3 triangular patterns will be eliminated. The specific value of the predetermined number is set according to actual requirements.

S13: Generate an attack instruction according to the connected pattern objects, so as to reduce a current health point value of a selected target attack object among multiple attack objects in a second interface according to the attack instruction.

The attack object is a non-player character, i.e., a game character not controlled by a real player in a game. The attack object is generally controlled by AI of a computer, and is a character having its own behavioral mode.

In an embodiment, the target attack object is determined according to a click operation of the user in the second interface. The user can select any attack object in the second interface. When the user's click operation on a certain attack object in the second interface is received, the clicked attack object is marked as the target attack object. In an embodiment, after the connected pattern objects are eliminated, the selected target attack object will be found from the multiple attack objects in the second interface, and after the target attack object is found, an attack value is generated to attack the target attack object, so as to reduce the current health point value of the target attack object according to the attack value.

To improve the game experience of the user, in an embodiment, different types of pattern objects correspond to different preset attack values. When the pattern objects are eliminated, the generated attack value for attacking the target attack object is equal to the number of the eliminated pattern objects multiplied by the preset attack value corresponding to each pattern object.

Figure 5:
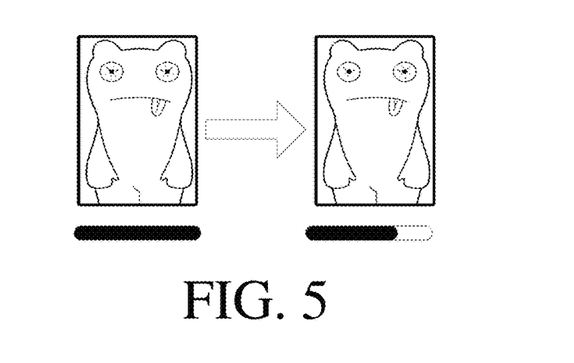
FIG. 5 is schematic diagram of a user interface after selection of a target attack object according to an embodiment.

As shown in FIG. 5, after the target object is attacked, the attack value received by the target attack object is subtracted from the current health point value of the target attack object, such that the target attack object switches from the state shown in the left picture to the state shown in the right picture, and the state in the right picture is displayed in the second interface, to inform the user that the target attack object has received an attack.

When the connected pattern objects are eliminated, an attack instruction for the selected target attack object among the multiple attack objects is generated to ensure that the attack object can be attacked during elimination of the pattern objects, avoiding the situation that the user's operation is invalid or the user does not perform the corresponding elimination operation, thereby improving the user experience while reducing the long duration of the game due to the lack of the corresponding elimination operation by the user, thus avoiding taking up excessive processing resources of the terminal and the server.

During the attack on the specified target attack object, the target attack object selected by the user does not uniquely correspond to a preset attack range of the connected pattern objects, e.g., the target attack object may appear right above or on the upper left of the connected pattern objects while the preset attack range of the pattern objects is the area right above the pattern objects. In this case, a corresponding attack path needs to be calculated in real time according to the attack range of the connected pattern objects and the position of the target attack object, so as to attack the target attack object. In order to reduce the computing pressure of the server and the terminal device caused by the real-time computing of the attack path, in an embodiment, the step of receiving an object swap instruction on a first interface of a screen includes: receiving the object swap instruction on the pattern matrix in a specified area of the first interface, where the specified area is determined according to a position of the target attack object in the second interface, the target attack object exists within a preset attack range of the attack instruction that is generated after any pattern object in the specified area is eliminated, and the specified area is highlighted in the first interface.

In an embodiment, before receiving the object swap instruction on the pattern matrix in the specified area of the first interface specified area, the terminal device receives, on the second interface, an object selection instruction sent by the user, and selects a corresponding target attack object from all the attack objects according to the object selection instruction. After the target attack object is selected according to the object selection instruction, the position of the target attack object is matched with preset attack ranges, so as to determine all pattern objects that can attack the attack object in the first interface and use these pattern objects as the specified area.

For example, the terminal device or server may pre-store an association table. The association table stores one or more preset attack ranges associated with the position of each attack object. Pattern objects within the preset range can attack the attack object associated with the preset range. After selecting the target attack object according to the object selection instruction, the terminal device may look up the association table for the preset attack range corresponding to the position of the attack object, thereby determining, from the first interface according to the preset attack range, all pattern objects that can attack the attack object.

In an embodiment, the attack instruction generated after the elimination of the pattern objects has a fixed preset attack range. For example, it is preset that the attack range after elimination of three identical pattern objects is an area in front of the three identical pattern objects. The preset attack range determined according to the position of the connected pattern objects is a union of set of the attack range of each pattern object.

For example, each pattern object has a fixed attack range. Considering that attack ranges of adjacent pattern objects generally overlap with each other, the preset attack range is a union of set of the attack range of each pattern object.

Figure 6:
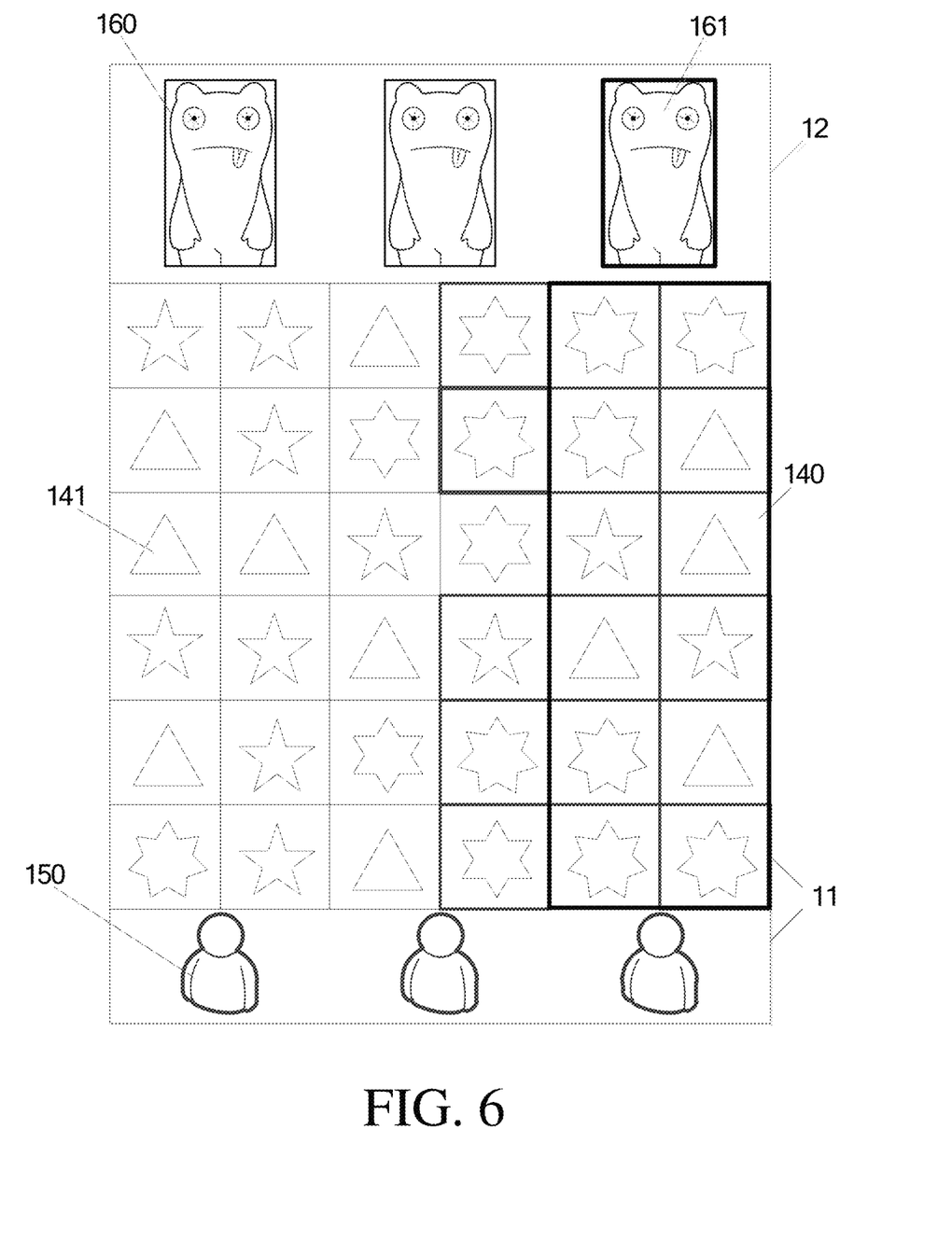
FIG. 6 is a schematic diagram of a second interface after selection of a target attack object according to an embodiment.

After the target attack object is selected, to prompt the user to swap pattern objects in the specified area to further reduce the probability of the user triggering an incorrect pattern object, in an embodiment, the terminal device highlights the specified area in the first interface. The highlighting may be outlining the frame of the specified area, such that the specified area is highlighted in the pattern matrix 140, as shown in FIG. 6.

The object swap instruction is received in the specified area having the target attack object therein within the preset attack range of the pattern objects, such that when the attack instruction is generated, the target attack object can be attacked by directly performing an attack operation according to the preset attack range. It is unnecessary to calculate the attack path for the target attack object in real time, thereby reducing the computing pressure of the server and the terminal device.

Figure 7:
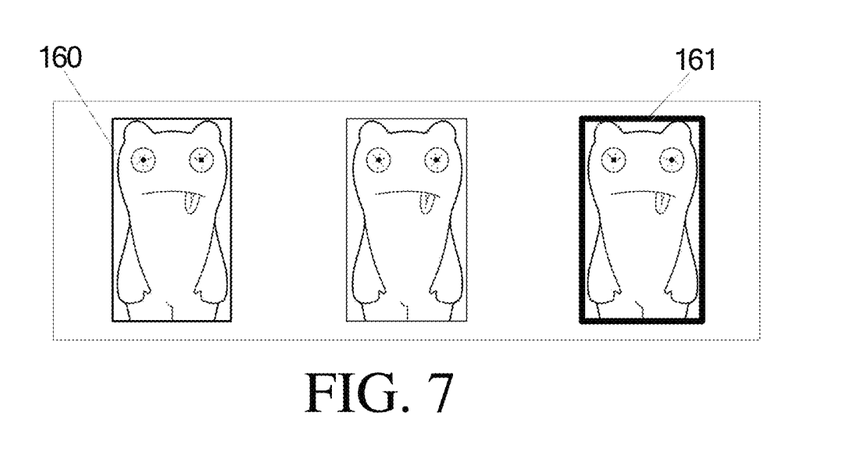
FIG. 7 is a schematic diagram of a health point value of a defense object according to an embodiment.

In an embodiment, to make it convenient for the user to determine whether the selected target attack object is an intended attack object so as to improve the interactivity between the user and the game, in an embodiment, after the user selects the target attack object from the multiple attack objects, the target attack object is highlighted in the second interface. The highlighting may be outlining the frame of the target attack object, such that the target attack object is highlighted in the second interface, to help the user to recognize the target attack object, as shown in FIG. 7.

In an embodiment, other areas in the first interface except the specified area are in a non-selectable state, and the non-selectable state indicates stopping reception of the object swap instruction.

After determining the specified area of the first interface according to the position of the target attack object selected by the user, the terminal device marks other areas in the first interface except the specified area as in a non-selectable state, such that other areas in the first interface except the specified area cannot receive the object swap instruction. That is, other areas in the first interface do not detect user operations. In this case, when the user performs a sliding operation or other operations on pattern objects in other areas, the terminal device does not swap positions of the pattern objects or eliminate the pattern objects.

Other areas in the first interface except the specified area are set in the non-selectable state, such that other areas in the first interface do not need to detect the object swap instruction, thereby reducing the computing amount of the terminal device and the server, and also avoiding the invalid computing of the server and the terminal caused by triggering of an incorrect pattern object in other areas by the player mistakenly, which reduces the probability of user's misoperation on pattern objects.

In an embodiment, after the step of reducing a current health point value of a selected target attack object among multiple attack objects in a second interface according to the attack instruction, the method further includes: detecting whether there is any attack object in the second interface, and if yes, controlling the attack object to attack at least one defense object in the first interface when display duration of the attack object in the first interface meets a preset condition.

In an embodiment, the preset condition may be timing setting for the attack object, e.g., 10 s. That is, the attack object is controlled to attack at least one defense object in the first interface at intervals of 10 s.

For example, different types of attack objects correspond to different numbers of attacks. For example, when an attack object of a certain type attacks the defense object, one attack will be generated; when an attack object of another type attacks the defense object, two attacks will be generated. The specific number of attacks may be set according to actual situations.

Figure 8:
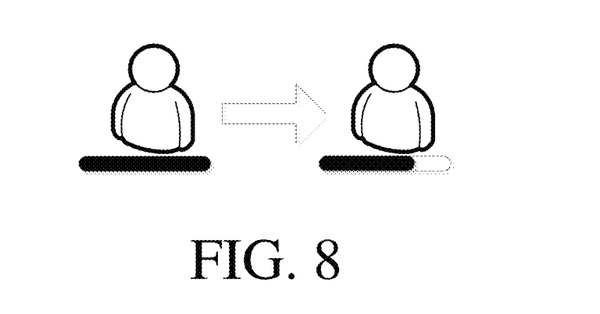
FIG. 8 is schematic diagram of a health point value of an attack object according to an embodiment.

As shown in FIG. 8, after the attack object attacks the defense object, an attack value of the attack object is subtracted from the current defense value of the defense object, such that the defense object switches from the state shown in the picture to the state shown in right picture, and the state is shown in the first interface, to inform the user that the attack object has struck an attack.

In an embodiment, the step of controlling the attack object to attack at least one defense object in the first interface when display duration of the attack object in the first interface meets a preset condition includes: controlling the attack object to attack at least one defense object within a preset attack range of the attack object when the display duration of the attack object in the first interface meets the preset condition.

For example, when the display duration of the attack object in the first interface meets the preset condition, the terminal device acquires a preset attack range of the attack object, and attacks all defense objects or a random defense object within the preset attack range of the attack object.

In an embodiment, the number of attacks by the attack object is in direct proportion to the display duration of the attack object in the second interface, that is, if the attack object has longer display duration in the second interface, the attack object strikes more attacks. The display duration of the attack object in the second interface is determined based on the current health point value of the attack object; if the current health point value of the attack object is less than the preset value, the attack object disappears in the second interface. When all the attack objects disappear in the second interface and the defense value of the defense object is greater than 0, a target object indicating a victory is displayed on the user interface. The target object may be a picture or an animation representing a game victory.

In order to reduce the area occupied by the first interface while ensuring that the first interface includes sufficient pattern objects for eliminating the attack objects, in an embodiment, after the connected pattern objects are eliminated, the method further includes: according to elimination positions corresponding to the pattern objects, moving pattern objects above the elimination positions downward to fill vacant positions; and generating new pattern objects to fill vacant positions after the downward movement.

After the identical pattern objects are eliminated, there will be vacant grids after the elimination. In this case, the pattern objects above the positions of the eliminated pattern objects are moved to the elimination positions. Then, after the existing pattern objects in the matrix are moved, the matrix still has vacant positions of which the number is the same as that of the eliminated pattern objects. To ensure the number of pattern objects in the matrix, the terminal device generates new pattern objects to fill the vacant positions.

Figure 9:
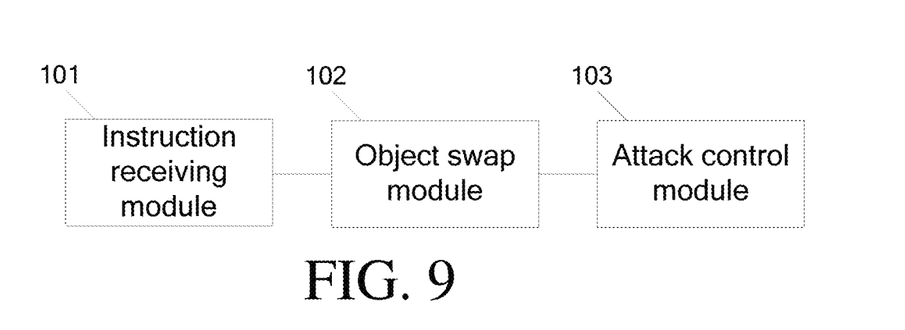
FIG. 9 is a schematic structural diagram of a game control apparatus according to an embodiment.

In an embodiment, a game control apparatus is provided. As shown in FIG. 9, the apparatus includes:

an instruction receiving module 101, configured to receive an object swap instruction on a pattern matrix of a first interface of a screen, where the pattern matrix comprises multiple matrix elements, and each matrix element is used for displaying a pattern object;

an object swap module 102, configured to swap positions of a first pattern object and a second pattern object according to the object swap instruction, and upon detection that a predetermined number of pattern objects of the same type are connected after the positions of the first pattern object and the second pattern object are swapped, eliminate the connected pattern objects; and an attack control module 103, configured to generate an attack instruction according to the connected pattern objects, so as to reduce a current health point value of a selected target attack object among multiple attack objects in a second interface according to the attack instruction.

In an embodiment, the instruction receiving module 101 is specifically configured to: receive the object swap instruction on the pattern matrix in a specified area of the first interface, where the specified area is determined according to a position of the target attack object in the second interface, the target attack object exists within a preset attack range of the attack instruction that is generated after any pattern object in the specified area is eliminated.

In an embodiment, the specified area is highlighted in the first interface.

In an embodiment, the target attack object is highlighted in the second interface.

In an embodiment, other areas in the first interface except the specified area are in a non-selectable state, and the non-selectable state indicates stopping reception of the object swap instruction.

In an embodiment, the attack control module 103 is further configured to:

control an attack object to attack at least one defense object in the first interface when display duration of the attack object in the first interface meets a preset condition.

In an embodiment, the attack control module 103 is further configured to:

control the attack object to attack at least one defense object within a preset attack range of the attack object when the display duration of the attack object in the first interface meets the preset condition.

In an embodiment, the number of attacks by the attack object is in direct proportion with the display duration of the attack object in the second interface, the display duration is determined according to the current health point value of the attack object, and when the current health point value is less than a preset value, the attack object disappears in the second interface.

In an embodiment, after eliminating the connected pattern object, the object swap module 102 is further configured to move, according to elimination positions corresponding to the pattern objects, pattern objects above the elimination positions downward to fill the elimination positions; and generate new pattern objects to fill vacant positions generated after the downward movement.

Figure 10:
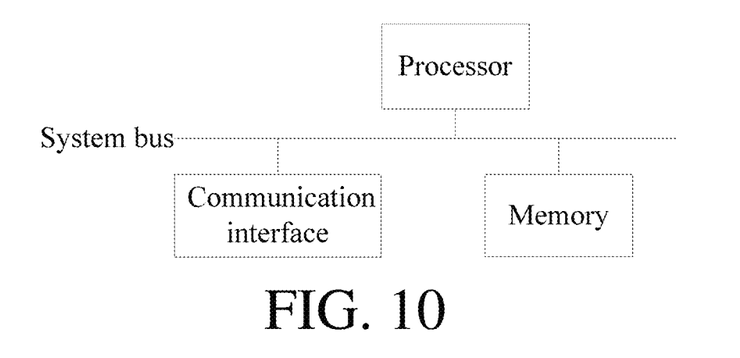
FIG. 10 is a structural block diagram of a computer device according to an embodiment.

In an embodiment, a computer device is provided. As shown in FIG. 10, the computer device includes a processor, a memory, a communication interface, an input apparatus and a display screen that are connected through a system bus. The storage device includes a non-volatile storage medium and an internal memory. The non-volatile storage medium of the computer device stores an operating system, and may also store a computer program. The computer program, when executed by the processor, causes the processor to implement the game control method. The internal memory may also store a computer program. The computer program, when executed by the processor, may cause the processor to perform the game control method. Those skilled in the art may understand that the structure shown in FIG. 10 is only a block diagram of a part of the structure related to the solution of the application and does not constitute a limitation on a computer device to which the solution of the application is applied. Specifically, the computer device may include more or less components than those shown in the figures, or combine some components, or have different component arrangements.

In an embodiment, the game control apparatus provided in the present disclosure may be implemented in the form of a computer program. The computer program may be run on the computer device shown in FIG. 10. The memory of the computer device may store various program modules forming the game control apparatus. The computer program formed by the program modules causes a processor to perform the steps of the game control method according to the embodiments of the present disclosure as described in this specification. The program modules include: an instruction receiving module 101, an object swap module 102, and an attack control module 103.

In an embodiment, a computer readable storage medium is provided. The computer readable storage medium stores a computer executable instruction, and the computer executable instruction causes a computer to perform the game control method described in the foregoing embodiment. The steps of the game control method herein may be the steps in the game control method in the foregoing embodiments.

The above merely describes preferred embodiments of the present application. It should be noted that, several improvements and modifications may be made by those of ordinary skill in the art without departing from the principle of the present application, and these improvements and modifications should also be considered within the scope of protection of the present invention.

A person of ordinary skill in the art may understand that all or some of the procedures in the methods of the foregoing embodiments may be implemented by a computer program instructing related hardware. The program may be stored in a computer readable storage medium. When the program is executed, the procedures in the embodiments of the foregoing methods may be performed. The storage medium may be a magnetic disk, an optical disc, a read-only memory (ROM), a random access memory (RAM), or the like.

The invention claimed is:

1. A game control method, applied to a terminal device, comprising:
receiving an object swap instruction on a pattern matrix of a first interface of a screen, wherein the pattern matrix comprises multiple matrix elements, and each matrix element is used for displaying a pattern object; wherein the terminal device displays a user interface comprising the first interface and a second interface; and the receiving an object swap instruction on a pattern matrix of a first interface of a screen comprises: when receiving a sliding operation from a position of a first pattern object to a position of a second pattern object, generating the object swap instruction according to the sliding operation by the terminal device;
swapping positions of the first pattern object and the second pattern object according to the object swap instruction, and upon detection that a predetermined number of pattern objects of the same type are connected after the positions of the first pattern object and the second pattern object are swapped, eliminating the connected pattern objects; and
generating an attack instruction according to the connected pattern objects, so as to reduce a current health point value of a selected target attack object among multiple attack objects in the second interface according to the attack instruction;
wherein the receiving an object swap instruction on a first interface of a screen comprises:
receiving the object swap instruction on the pattern matrix in a specified area of the first interface, wherein the specified area is determined according to a position of the target attack object in the second interface, the target attack object exists within a preset attack range of the attack instruction that is generated after any pattern object in the specified area is eliminated, and the specified area is highlighted in the first interface;
wherein other areas in the first interface except the specified area are in a non-selectable state, and the non-selectable state indicates stopping reception of the object swap instruction.

2. The game control method according to claim 1, wherein the target attack object is highlighted in the second interface.

3. The game control method according to claim 1, further comprising:
controlling an attack object to attack at least one defense object in the first interface when display duration of the attack object in the first interface meets a preset condition.

4. The game control method according to claim 3, wherein the controlling an attack object to attack at least one defense object in the first interface when display duration of the attack object in the first interface meets a preset condition comprises:
controlling the attack object to attack at least one defense object within a preset attack range of the attack object when the display duration of the attack object in the first interface meets the preset condition.

5. The game control method according to claim 3, wherein the number of attacks by the attack object is in direct proportion with display duration of the attack object in the second interface, the current health point value of the display duration is determined according to the attack object, and the attack object disappears from the second interface when the current health point value is less than a preset value.

6. The game control method according to claim 1, after the eliminating the connected pattern objects, further comprising:
moving, according to elimination positions corresponding to the pattern objects, pattern objects above the elimination positions downward to fill the elimination positions; and
generating new pattern objects to fill vacant positions generated after the downward movement.

7. An electronic device, comprising: a memory, a processor, and a computer program stored in the memory and runnable on the processor, wherein the processor, when executing the computer program, implements the game control method as defined in claim 1.

8. A computer readable storage medium, wherein the computer readable storage medium stores a computer program, and the computer program, when running on one or more processors, implements the game control method as defined in claim 1.

9. A game control apparatus, comprising:
an instruction receiving module, configured to receive an object swap instruction on a pattern matrix of a first interface of a screen, where the pattern matrix comprises multiple matrix elements, and each matrix element is used for displaying a pattern object; wherein a terminal device displays a user interface comprising the first interface and a second interface; and the receiving an object swap instruction on a pattern matrix of a first interface of a screen comprises: when receiving a sliding operation from a position of a first pattern object to a position of a second pattern object, generating the object swap instruction according to the sliding operation by the terminal device;

an object swap module, configured to swap positions of the first pattern object and the second pattern object according to the object swap instruction, and upon detection that a predetermined number of pattern objects of the same type are connected after the positions of the first pattern object and the second pattern object are swapped, eliminate the connected pattern objects; and an attack control module, configured to generate an attack instruction according to the connected pattern objects, so as to reduce a current health point value of a selected target attack object among multiple attack objects in the second interface according to the attack instruction;

wherein the receiving an object swap instruction on a first interface of a screen comprises:

receiving the object swap instruction on the pattern matrix in a specified area of the first interface, wherein the specified area is determined according to a position of the target attack object in the second interface, the target attack object exists within a preset attack range of the attack instruction that is generated after any pattern object in the specified area is eliminated, and the specified area is highlighted in the first interface;

wherein other areas in the first interface except the specified area are in a non-selectable state, and the non-selectable state indicates stopping reception of the object swap instruction.

\* \* \* \* \*